United States Patent
Ishihara et al.

(10) Patent No.: US 12,225,322 B2
(45) Date of Patent: Feb. 11, 2025

(54) RECORDING APPARATUS, TIME SETTING CONTROL METHOD, AND STORAGE MEDIUM

(71) Applicant: CASIO COMPUTER CO., LTD., Tokyo (JP)

(72) Inventors: Muneyuki Ishihara, Chofu (JP); Yuya Hayashi, Shiroi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 48 days.

(21) Appl. No.: 18/119,367

(22) Filed: Mar. 9, 2023

(65) Prior Publication Data

US 2023/0291867 A1    Sep. 14, 2023

(30) Foreign Application Priority Data

Mar. 11, 2022  (JP) ................................. 2022-037694

(51) Int. Cl.
| | |
|---|---|
| H04N 5/77 | (2006.01) |
| G11B 27/10 | (2006.01) |
| H04N 9/82 | (2006.01) |
| H04N 21/433 | (2011.01) |

(52) U.S. Cl.
CPC ............... H04N 5/77 (2013.01); G11B 27/10 (2013.01)

(58) Field of Classification Search
None
See application file for complete search history.

(56) References Cited

U.S. PATENT DOCUMENTS

| 8,279,224 B2 | 10/2012 | Takanezawa | |
|---|---|---|---|
| 9,030,567 B2 | 5/2015 | Ichihara | |
| 2009/0248900 A1* | 10/2009 | Marucheck | G06F 1/12 |
| | | | 713/400 |
| 2010/0054702 A1 | 3/2010 | Kobayashi et al. | |
| 2017/0208250 A1 | 7/2017 | Uemura | |

(Continued)

FOREIGN PATENT DOCUMENTS

| JP | H09186953 A | 7/1997 |
|---|---|---|
| JP | 2003309793 A | 10/2003 |
| JP | 2013181837 A | 9/2013 |

OTHER PUBLICATIONS

Extended European Search Report (EESR) dated Jun. 23, 2023, issued in counterpart European Application No. 23159389.8.

(Continued)

*Primary Examiner* — Hung Q Dang
(74) *Attorney, Agent, or Firm* — Holtz, Holtz & Volek PC

(57) ABSTRACT

A recording apparatus includes the following. A timekeeper keeps time. A recorder records data. At least one processor is configured to perform, associating the time at a timing that the data is recorded in the recorder to the data as recorded time, the time based on the kept time kept by the timekeeper, obtaining modified time regarding modification of the kept time, and in a situation that it is determined that a predetermined condition to determine whether there is a possibility that the modified time is before the recorded time associated to the latest data is satisfied, associating the time in which the kept time is not modified based on the modified time to the data recorded thereafter as the recorded time.

20 Claims, 8 Drawing Sheets

(56) References Cited

U.S. PATENT DOCUMENTS

2017/0357303 A1* 12/2017 Kopetz ................ H04J 3/0638

OTHER PUBLICATIONS

Australian Examination Report dated Nov. 21, 2023, issued in Australian Application No. 2023201166.
Taiwanese Office Action (and an English language translation thereof) dated May 21, 2024, issued in counterpart Taiwanese Application No. 112108065.

* cited by examiner

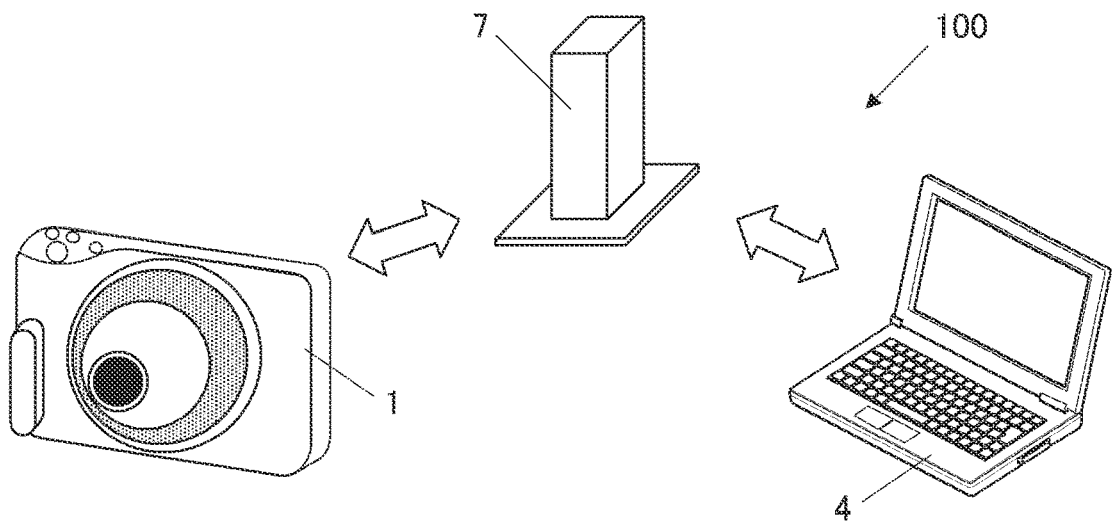
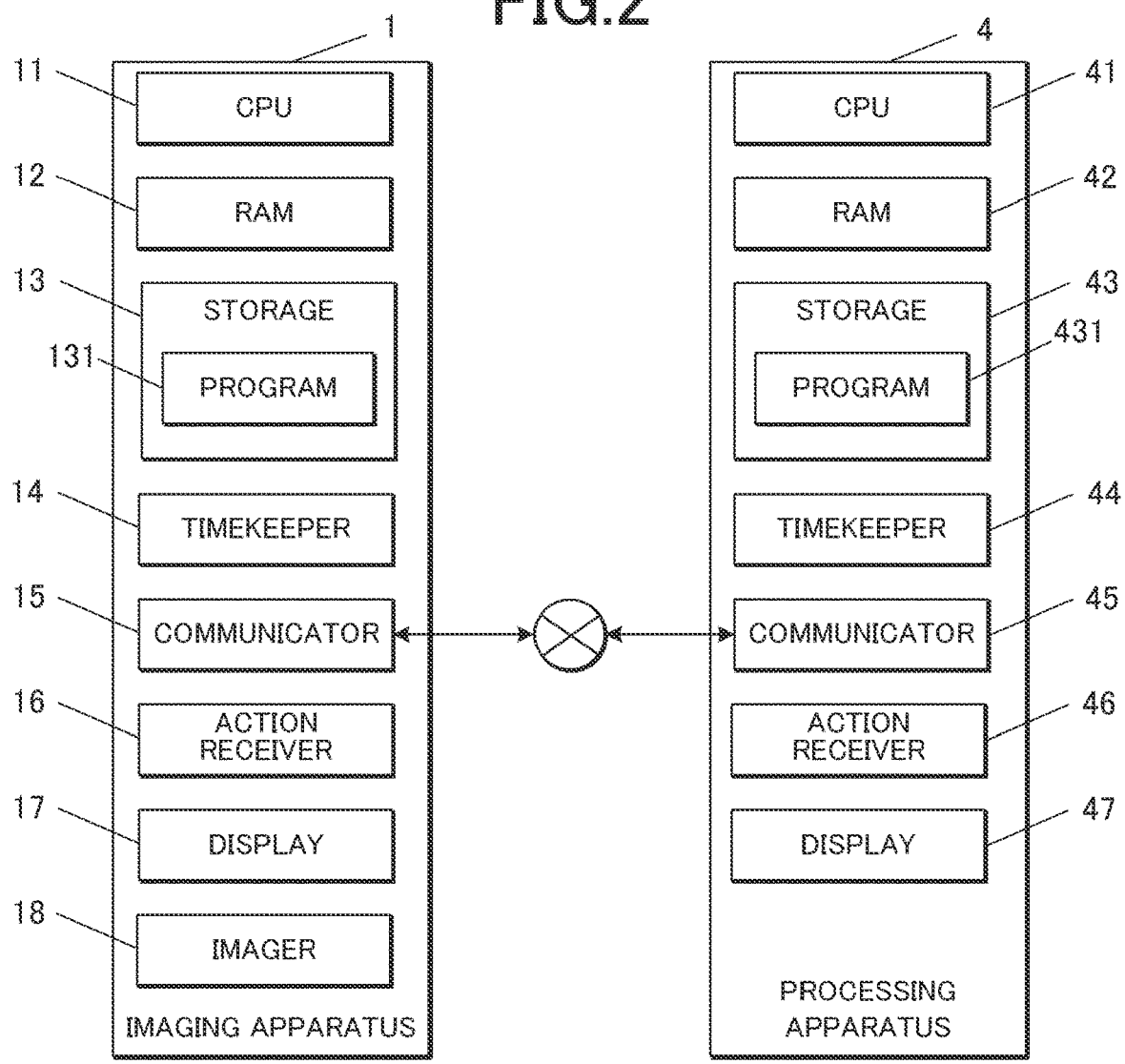

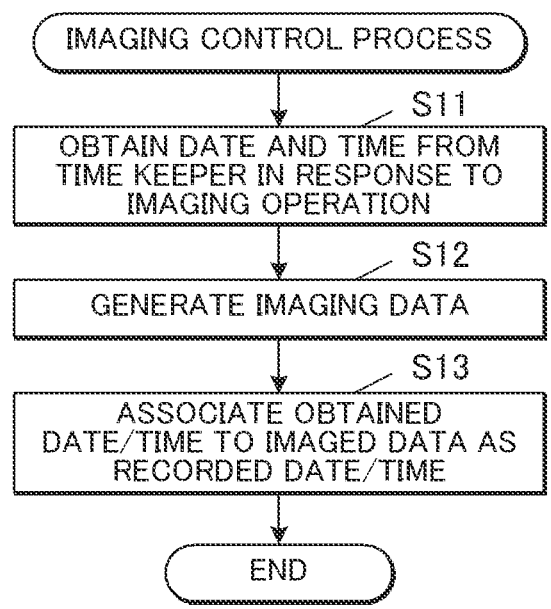

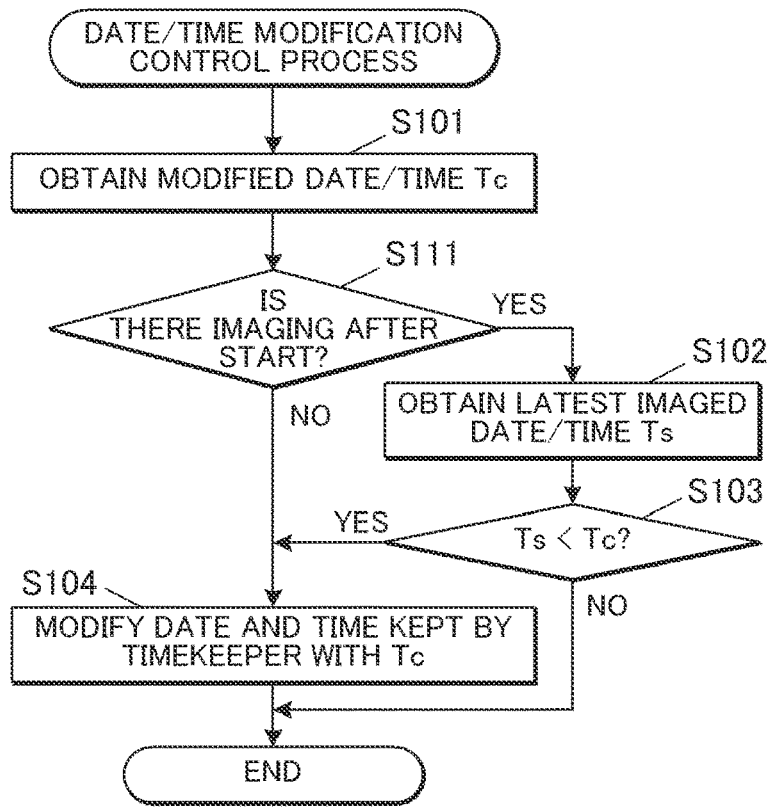
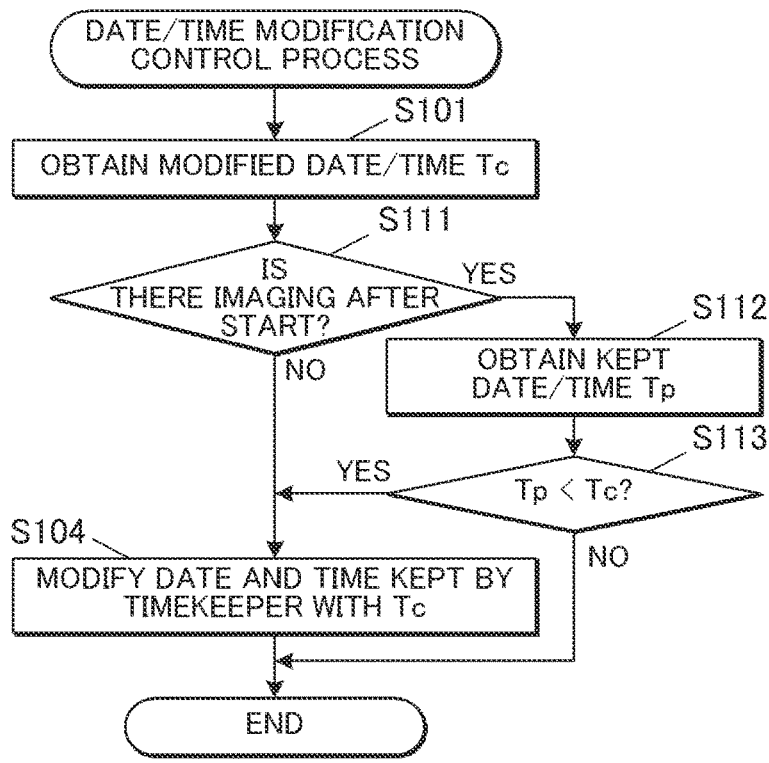

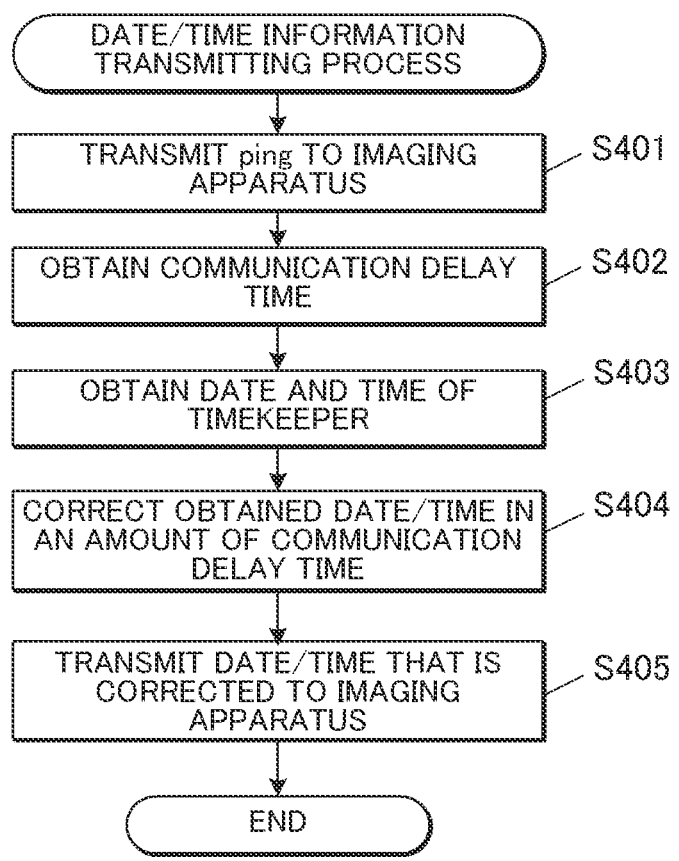

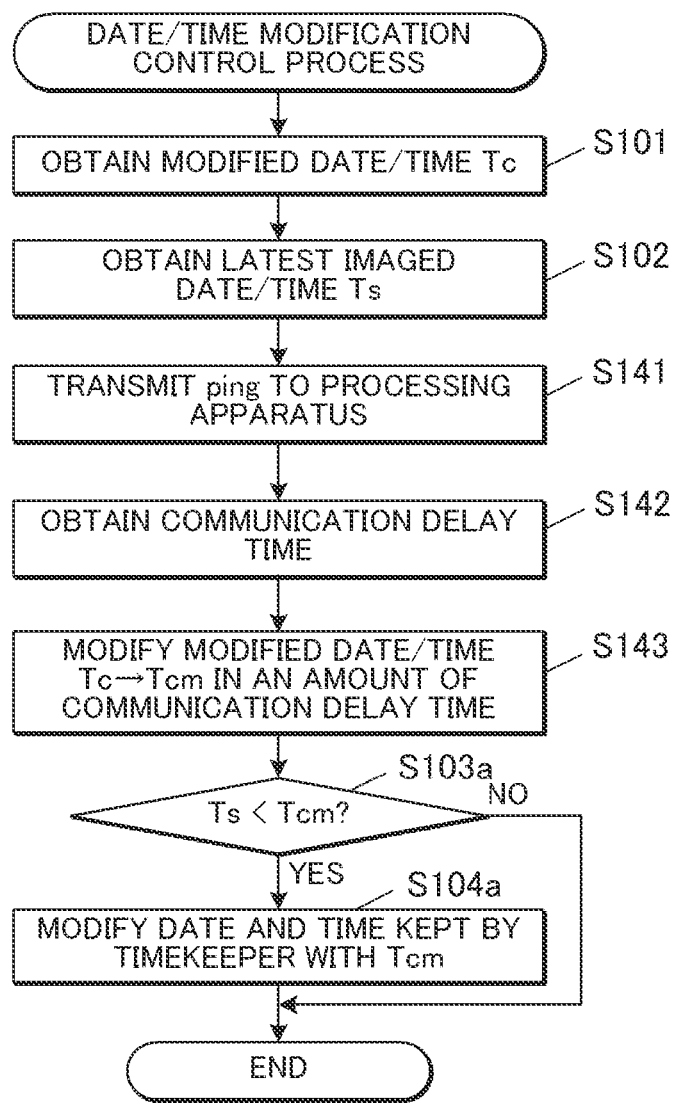

RECORDING APPARATUS, TIME SETTING CONTROL METHOD, AND STORAGE MEDIUM

REFERENCE TO RELATED APPLICATIONS

This application is based upon and claims the benefit of priority from the prior Japanese Patent Application No. 2022-037694, filed on Mar. 11, 2022, the entire contents of which are incorporated herein by reference.

TECHNICAL FIELD

The present invention relates to a recording apparatus, a time setting control method, and a storage medium.

DESCRIPTION OF RELATED ART

There are recording apparatuses such as imaging apparatuses that record digital imaging data by performing imaging with visible light or imaging with infrared rays, or audio recording apparatuses that record digital audio data by recording sound. Such apparatuses include a timekeeping function, and date/time information is associated to and stored with the recorded data at the time when the data is recorded.

However, most recording apparatuses operate alone. Therefore, if the user does not suitably adjust the kept date and time, the recorded date/time attached to the recorded data becomes inaccurate. JP H9-186953 describes a technique in which even if date/time information is reset due to the battery being exchanged in the camera, and then incorrect date and time are attached to the imaged data, the date and time attached to the imaged data are modified to the accurate recorded date/time when the accurate date/time information is obtained from outside.

SUMMARY OF THE INVENTION

In order to achieve the above problems, according to the present disclosure, a recording apparatus includes: a timekeeper that keeps time; a recorder that records data; and at least one processor configured to perform, associating the time at a timing that the data is recorded in the recorder to the data as recorded time, the time based on the kept time kept by the timekeeper, obtaining modified time regarding modification of the kept time, and in a situation that it is determined that a predetermined condition to determine whether there is a possibility that the modified time is before the recorded time associated to the latest data is satisfied, associating the time in which the kept time is not modified based on the modified time to the data recorded thereafter as the recorded time.

BRIEF DESCRIPTION OF DRAWINGS

FIG. 1 is a diagram showing a recording system according to the present embodiment.

FIG. 2 is a block diagram showing a functional configuration of an imaging apparatus and a processing apparatus.

FIG. 3 is a flowchart showing a control procedure of an imaging control process.

FIG. 6A is a flowchart showing a third example of a control procedure of the date/time modification control process.

FIG. 6B is a flowchart showing a fourth example of a control procedure of the date/time modification control process.

FIG. 9 is a flowchart showing a control procedure of a date/time information transmitting process performed in the processing apparatus.

FIG. 10 is a flowchart showing a seventh example of a control procedure of the date/time modification control process.

DETAILED DESCRIPTION

Figure 4A:
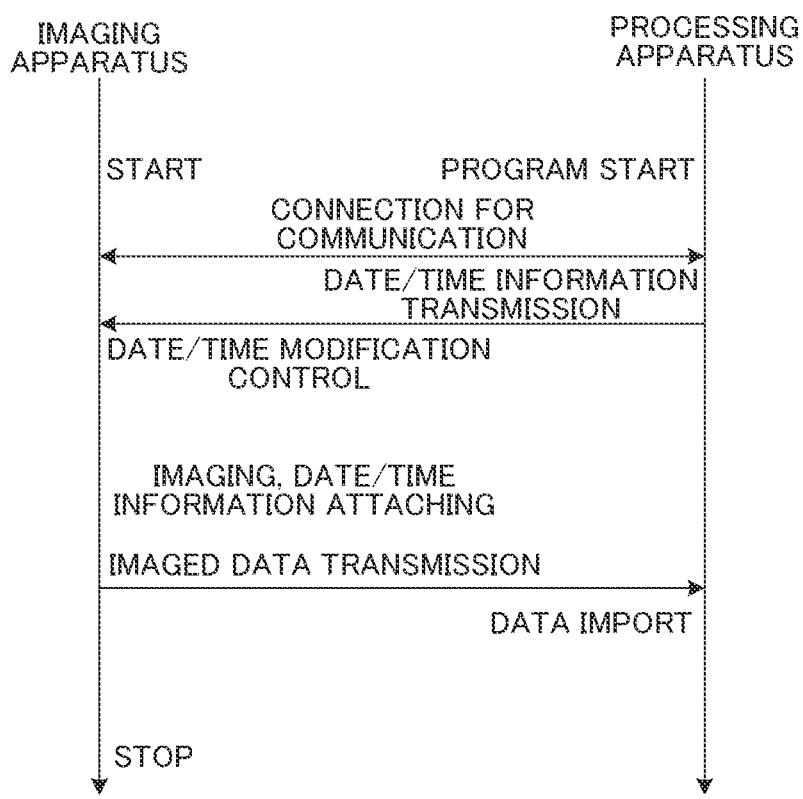
FIG. 4A shows a sequence diagram showing contents of communication and timing of processing between the imaging apparatus and the processing apparatus.

Hereinafter, embodiments of the present disclosure are described with reference to the drawings.

FIG. 1 is a diagram showing a recording system 100 according to the present embodiment.

The recording system 100 includes an imaging apparatus 1 and a processing apparatus 4, and the above apparatuses are able to communicate with each other by wireless communication through a router 7. Although not limited, the recording system 100 obtains and manages medical images. The image data imaged in the imaging apparatus 1 is obtained by the processing apparatus 4. The image data is associated with information of the patient and then stored or output to an external medical management system.

The imaging apparatus 1 which is a recording apparatus according to the present embodiment is a digital camera and detects incident light to generate image data. The recording apparatus here is an apparatus that detects, measures, and records data of a certain recording target at a certain timing or within a limited term. In addition to imaging apparatuses, audio recording apparatuses, physical sensors that measure various physical quantities regarding mechanics, thermodynamics, and/or electromagnetics and the like may be included as the recording apparatus. The imaging apparatus (digital camera) includes an event recording apparatus which continuously operates or is turned on intermittently and stores recorded data in a situation that an event that satisfies a specific condition is detected. The physical sensor includes a biosensor that singly or intermittently measures a human life state or activity state mainly in response to an instruction of a person in charge. On the other hand, live cameras and monitoring sensors that are able to record continuously (very short intervals, such as less than one second) regardless of individual instructions to record or events occurring are not included.

For example, the processing apparatus 4 is a personal computer (PC), and performs an application program (program 431) that obtains and manages image data imaged by the imaging apparatus 1. The PC may be a desktop type or a laptop type. Alternatively, the processing apparatus 4 may be a tablet terminal.

The imaging apparatus 1 and the processing apparatus 4 are able to transmit and receive data by wireless communication such as Wi-Fi.

FIG. 2 is a block diagram showing a functional configuration of the imaging apparatus 1 and the processing apparatus 4.

The imaging apparatus 1 includes a CPU 11 (Central Processing Unit, controller), a RAM 12 (Random Access Memory), a storage 13, a timekeeper 14, a communicator 15, an action receiver 16, a display 17, and an imager 18 (recorder).

The CPU 11 is a processor that performs arithmetic processing and that centrally controls the entire operation of the imaging apparatus 1. The CPU 11 may include a single processor, or may include a plurality of processors and the processors may operate parallel or individually according to the intended use. The CPU 11 obtains the date and time of the timekeeper 14 at the timing when the imaging operation is performed by the imager 18 and the imaged image data is generated, and the date and time are associated to the recorded image data as the imaged date/time (recorded date/time).

The RAM 12 provides a working memory space for the CPU 11 and stores temporary data. The RAM 12 is not limited and may be a DRAM, for example.

The storage 13 includes a nonvolatile memory such as a flash memory. The storage 13 stores setting data, imaged image data and a program 131. The setting data may include identification information of the processing apparatus 4 that outputs the imaged image data. Alternatively, the imaged image data may be output simply in response to a request from an external device connected to perform communication.

The timekeeper 14 keeps the present date and time. The timekeeper 14 here includes, in addition to a counter (RTC, real time clock) that continuously counts the date and time even when the CPU 11 is not operating as hardware, a date/time counting function (system clock) which is performed by the CPU 11 that counts a clock signal by an oscillating circuit (not shown).

The communicator 15 controls transmitting and receiving of data with external devices by a predetermined communication standard. The communication standard may be a standard that relates to wireless LAN (Wi-Fi), for example. In addition to or instead of the above, the standard may be related to short range wireless communication such as Bluetooth (registered trademark). The communicator 15 includes a network card in order to perform communication. The communicator 15 may include a connection terminal related to direct communication by a USB (Universal Serial Bus).

The action receiver 16 receives input action by the user and outputs an action signal according to the input action to the CPU 11. For example, the action receiver 16 may include some or all of the following, for example, a press button switch, rotating switch, sliding switch, a touch panel, and the like. For example, the action receiver 16 includes a switch that receives action to switch whether or not to perform action (on/off) of the imaging apparatus 1 (own apparatus) and a switch that receives action to release a shutter to perform imaging.

The display 17 includes a display that displays a preview image in a direction of a field of view in imaging, an imaged image and its status, and an imaging menu. For example, the display may be a liquid crystal display screen (LCD).

Among the above, at least the CPU 11, the RAM 12 and the communicator 15 are included in the computer according to the present embodiment.

The imager 18 images an image in a direction of the field of view and generates (records) imaged image data. The imager 18 includes an optical system such as a lens and a detector such as a CMOS sensor, a CCD sensor or the like. The imager 18 detects an amount of light of light that enters the range of the field of view and that is sent to the detector through the optical system in a unit of pixels arranged two-dimensionally. Then, the imager 18 generates and records the image data as a luminance distribution in a unit of pixels.

In the imaging apparatus 1, power is supplied to various sections by a detachable dry battery or rechargeable battery or a rechargeable battery that is built in the imaging apparatus 1. In addition to or instead of the above, the imaging apparatus 1 may be able to operate by receiving power from outside through a power supply cable connected to a power supply terminal. In this case, it may be possible to charge the rechargeable battery by the power supplied at this time.

In addition to the above, the imaging apparatus 1 may include a light emitter that is able to illuminate the imaging target to be an appropriate illuminance.

The processing apparatus 4 (information processing apparatus) includes a CPU 41 (controller), a RAM 42, a storage 43, a timekeeper 44, a communicator 45, an action receiver 46, and a display 47.

The CPU 41 is a processor that performs arithmetic processing and that centrally controls the entire operation of the processing apparatus 4. The CPU 41 may include a single processor, or may include a plurality of processors and the processors may operate parallel or individually according to the intended use.

The RAM 42 provides a working memory space for the CPU 41 and stores temporary data. The RAM 42 is not limited and may be a DRAM, for example.

The storage 43 includes a nonvolatile memory such as a hard disk drive (HDD), a flash memory, or the like. The storage 43 stores setting data, medical information including imaged image data obtained from the imaging apparatus 1, and the program 431. The setting data may include identification information of the imaging apparatus 1 which is the target of connection for communication in order to obtain the imaged image data.

The timekeeper 44 keeps the present date and time. The timekeeper 44 here includes, in addition to a counter (RTC, real time clock) that continuously counts the date and time even when the CPU 41 is not operating as hardware, a date/time counting function (system clock) which is performed by the CPU 41 that counts a clock signal by an oscillating circuit (not shown).

In general, the PC is periodically connected to a time information distribution server such as an NTP (Network Time Protocol) server to obtain the date and time, and the date and time kept by the timekeeper 44 are adjusted. Therefore, the difference from the actual date and time can be kept small.

The communicator 45 controls transmitting and receiving of data with external devices by a predetermined communication standard. The communication standard is to be a standard that is common to the imaging apparatus 1 so as to be able to communicate with the imaging apparatus 1. Here, the communication standard includes a wireless LAN (Wi-Fi). In addition to this, TCP/IP and UPD regarding wired LAN may also be included. The communicator 45 includes a network card (board) capable of the above communication. The communicator 45 may include a connection terminal related to direct communication by a USB (Universal Serial Bus).

The action receiver 46 receives action of input by the user and outputs an action signal according to the input action to the CPU 41. The action receiver 46 includes a pointing device such as a mouse, a keyboard, and the like, for example. The action receiver 46 may include a power supply switch, a reset switch and the like of the processing apparatus 4.

The display 47 includes a display, and performs display based on the control by the CPU 41. For example, the display may be a liquid crystal display screen (LCD). The display 47 may include an LED lamp, etc. to show the state of operation.

The action receiver 46 and/or the display 47 may be peripheral devices (configuration outside the processing apparatus 4) connected through the connection terminal of the communicator 45.

Next, the time setting control method according to the present embodiment is described.

In the imaging apparatus 1, when the image is imaged, the date and time of the imaged timing (recorded timing) is obtained from the timekeeper 14. The obtained date and time are stored associated with the generated imaged image data as recorded date/time.

FIG. 3 is a flowchart showing a control procedure by the CPU 11 in an imaging control process. The imaging control process starts each time the action receiver 16 receives the imaging action (pressing of shutter button).

The CPU 11 obtains the date and time of the imaging timing from the timekeeper 14 in response to the imaging operation (step S11). The CPU 11 generates the imaged image data of the determined format based on the luminance distribution of the incident light detected by the detector of the imager 18 in the imaging operation and stores the imaged image data in the storage 13 (step S12). Although the format is not limited, for example, the format may be a JPEG format.

The CPU 11 stores the obtained date and time associated with the imaged image data as the recorded date/time of the imaged image data (step S13). The association as described here may be to save the recorded date/time data in the same file as the data of the imaged image itself or the data can be managed separately. For example, the recorded date/time data may be included in metadata attached to the data of the imaged image itself. Then, the CPU 11 ends the imaged control process.

As described above, according to the imaging apparatus 1 of the present embodiment, the recorded date/time may be simply obtained from the timekeeper 14.

A date/time modification operation is performed in the imaging apparatus 1 independently from the above imaging operation and the association of the imaged date/time to the imaged image data.

In order to match the imaged image data of the imaging apparatus 1 with the timing that the other information included in the processing apparatus 4 is obtained, the date and time of the timekeeper 14 and the timekeeper 44 need to be basically the same in the processing apparatus 4 and the imaging apparatus 1. Generally, the manual setting to input modification of the date/time on the imaging apparatus 1 is troublesome, and when the imaging operation is performed alone without connection to the processing apparatus 4 or in a state in which the supply of power is stopped, the adjustment of the date and time kept by the timekeeper 14 is not performed. If the above situation is left unattended, the kept date/time is gradually shifted from the accurate date/time (for example, with an accuracy of a clock, a maximum of 0.5 seconds a day, with an accuracy (one-ten thousand-th) of a typical PC under undesirable conditions, a maximum of 8.6 seconds a day). Therefore, depending on the environment of use, a difference from the accurate time in an amount of a few seconds to a few minutes easily occurs. However, in a situation in which the imaged image data imaged by the imaging apparatus 1 is managed collectively with external medical information, if there is a difference in the date/time between the external medical information and the imaging apparatus 1, there may be difficulty in integrating the external medical information with the imaged image data. Especially in medical data, it is not preferable to allow the date and time attached to the imaged image data to be modified later on because this may led to unauthorized tampering of data. Therefore, the imaged date/time as accurate as possible needs to be attached from the beginning.

In view of the above, when the imaging apparatus 1 is connected to the processing apparatus 4 for communication, by performing the program 431 in the processing apparatus 4, the imaging apparatus 1 is easily able to receive from the processing apparatus 4 (outside) through the communicator 15 date/time data based on the date and time kept by the timekeeper 44. When the program 431 is started in the processing apparatus 4, the user is able to easily perform the action to request transmission of the date/time data to the imaging apparatus 1 on the screen displayed on the display 47. Alternatively, in response to the setting, the program 431 may confirm whether or not it is possible to connect to the imaging apparatus 1 for communication at least when the program 431 is started. When the connection for communication is possible and the connection for communication is established, the date/time data may be transmitted automatically. In a situation that the imaging apparatus 1 is not started or is not in a communicable place when the program 431 is started and the connection for communication is not established, the processing apparatus 4 may periodically output a signal to search for the imaging apparatus 1 or a signal to search for the imaging apparatus 1 may be output in response to an input action on the action receiver 46. Alternatively, depending on the setting of the imaging apparatus 1, the processing apparatus 4 may wait for communication from the imaging apparatus 1.

By easily modifying the date/time for each examination date, it is possible to suppress a large shift in the date/time.

Figure 4B:
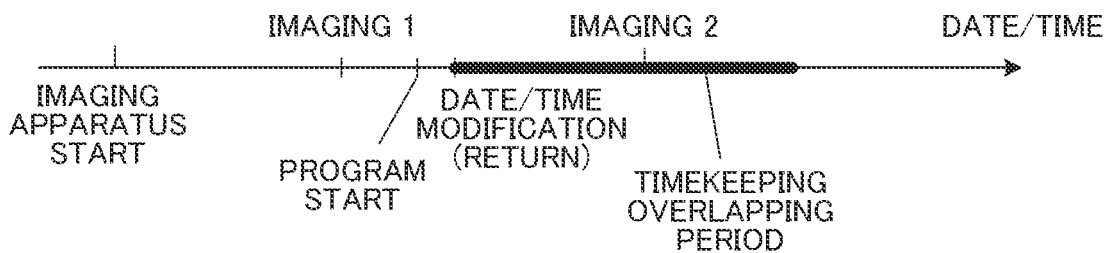
FIG. 4B is a diagram describing a relation between imaging timing and modification of the date/time.

FIG. 4A shows a sequence diagram showing contents of communication and timing of processing between the imaging apparatus 1 and the processing apparatus 4. FIG. 4B is a diagram describing a relation between imaging timing and modification of the date/time.

As shown in FIG. 4A, when the operation of the imaging apparatus 1 is turned on and the program 431 is started in the processing apparatus 4, the connection for communication is established between the imaging apparatus 1 and the processing apparatus 4, and the date/time information is transmitted from the processing apparatus 4 to the imaging apparatus 1. The imaging apparatus 1 receives the date/time information and performs the control process regarding the modification of the date/time kept by the timekeeper 14. Then, when the imaging is performed with the imaging apparatus 1, the date and time kept by the timekeeper 14 at the imaging timing is attached to the imaged image data. The imaged image data with the date/time data attached is transmitted to the processing apparatus 4 as necessary or according to a transmission request from the processing apparatus 4 (based on a transmission request by the user). The imaged image data obtained by the processing apparatus 4 is integrated with the other medical data as necessary.

Here, the imaging apparatus 1 and the program 431 in the processing apparatus 4 are not always turned on at the same timing. For example, according to necessity, the power of the imaging apparatus 1 is often turned off once imaging of a certain patient is finished, and the power is turned off until when the next patient who needs to be imaged is imaged. In this case, near the timing that the imaging apparatus 1 is turned on a second time or more in the same day, the program 431 is often left running on the processing apparatus 4. In this case, the modification of the date/time is performed right after the imaging apparatus 1 is started. Therefore, the imaged date/time attached to the imaged image data is maintained to be in an accurate state. Therefore, even after the imaged image data is integrated with the medical data, there is no difference from the other medical data, for example, the time that the imaged patient is diagnosed. Therefore, the imaged image data can be suitably managed.

On the other hand, there may be a situation such as the program 431 is not yet running in the processing apparatus 4 when the first patient of the day is imaged. For example, the program 431 may be started and the connection for communication may be established after the operation of the imaging apparatus 1 starts (is turned on) and the imaging operation is performed. In this case also, if the date/time is modified for each examination date as described above, an absolute value of the difference is unlikely to become large.

However, FIG. 4B shows a situation in which after the imaging apparatus 1 is started and the "imaging 1" is performed, the processing apparatus 4 is started in order to display the image, and then the program 431 is started causing the date/time modification operation to be performed. If the date/time modification causes the kept date/time to go back in time, there is an overlapping period (timekeeping overlapping period) in which the date and time is repeatedly counted from the modified date/time to the date/time before modification, that is, the original date/time before going back in time. If the "imaging 2" is performed in this timekeeping overlapping period, the recorded date/time attached to the imaged image data of the "imaging 2" performed later may have an earlier date/time than the recorded date/time attached to the imaged image data of "imaging 1" that is actually performed before the "imaging 2". The order of imaging is often important information (specifically, imaged image data should not be confused among different patients). Therefore, it is not preferable if the actual order of imaging and the order of the recorded date/time attached to the imaged image data are reversed.

In the imaging apparatus 1 according to the present embodiment, in a situation that the date/time information (modified date/time) is obtained from the outside processing apparatus 4, control is performed so that change of the date/time that may cause the recorded date/time and the imaged order to be reversed does not occur.

Figure 5A:
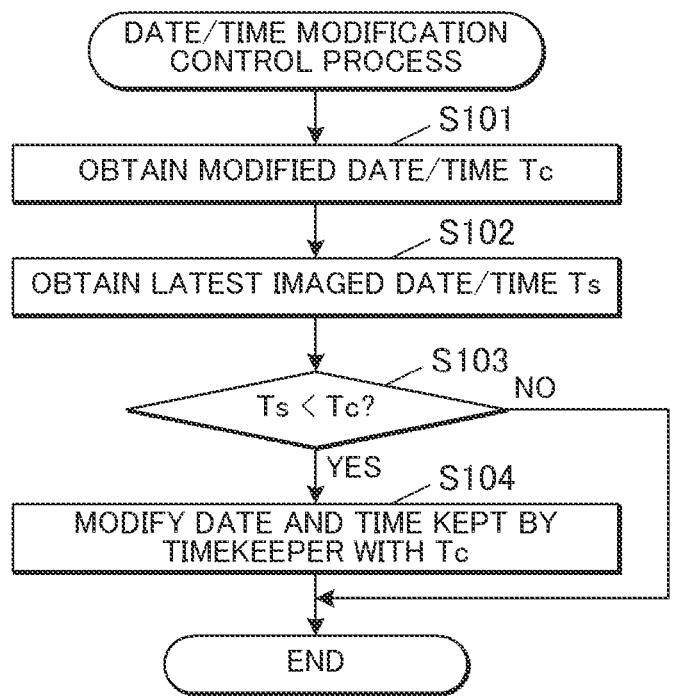
FIG. 5A is a flowchart showing a first example of a control procedure of the date/time modification control process.
Figure 5B:
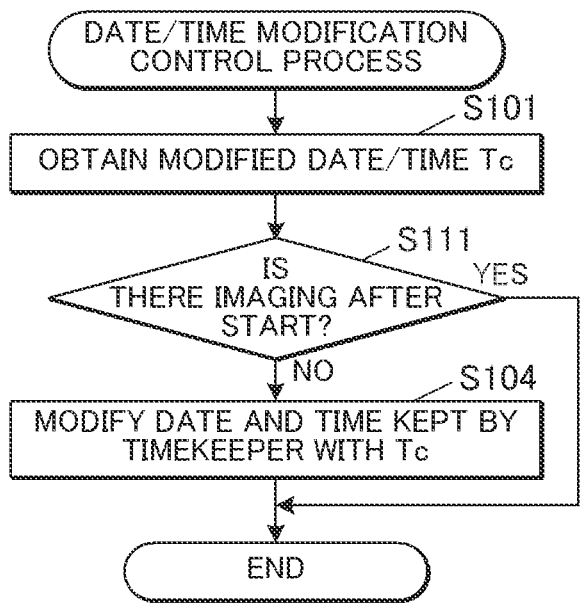
FIG. 5B is a flowchart showing a second example of a control procedure of the date/time modification control process.

FIG. 5A and FIG. 5B are flowcharts showing a first example and a second example of the control procedure performed by the CPU 11 in the date/time modification control process performed in the imaging apparatus 1.

Such date/time modification control process is automatically started in a situation that the connection for communication with the processing apparatus 4 is established and the date/time information is received.

According to the first example of the date/time modification control process shown in FIG. 5A, the CPU 11 obtains a received modified date/time Tc (step S101). The CPU 11 obtains the latest imaged date/time Ts (that is, the latest date/time among the imaging operation performed so far) (step S102). If the imaged image data is stored in the storage 13, the data of the latest imaged date/time Ts can be directly read out. The latest imaged date/time Ts can be stored separately from the imaged image data so that the imaged date/time Ts can be obtained even after the imaged image data is transmitted outside (processing apparatus 4) and deleted.

The CPU 11 determines whether the modified date/time Tc is larger than (ahead of, may be "equal to or larger than" instead of "larger than") the latest imaged date/time Ts (first condition is not satisfied) (step S103). If it is determined that the modified date time Tc is larger than the latest imaged date/time Ts ("YES" in step S103), the CPU 11 modifies the date/time kept by the timekeeper 14 (kept date/time) to the modified date/time Tc (step S104). Then, the CPU 11 ends the date/time modification control process. If it is determined that the modified date/time Tc is not lager than the latest imaged date/time Ts (step S103, "NO"), the CPU 11 ends the date/time modification control process.

That is, in the date/time modification control process according to the first example, the CPU 11 does not perform date/time modification if the date/time goes back earlier than the latest imaged date/time Ts (recorded date/time of imaged image data).

According to the second example of the date/time modification control process shown in FIG. 5B, the process in step S101 and the process in step S104 are the same as in the first example of the date/time modification control process. The same reference numerals are applied to the same process and the detailed description is omitted.

After the process in step S101, the CPU 11 determines whether the imaging operation is already performed after the imaging apparatus 1 is started in this occasion (whether the third condition is satisfied) (step S111). If it is determined that the imaging operation is not performed (step S111, "NO"), the process of CPU 11 proceeds to step S104. If it is determined that the imaging operation is already performed (step S111, "YES"), the CPU 11 ends the date/time modification control process.

When the diagnosis is performed, the operation of the imaging apparatus 1 is turned off while the patient changes as described above. Normally, considering the amount of time used to change the patient and the amount of time necessary to describe the examination to the patient and to answer the patient's questions, the term that the operation is turned off becomes longer than the shift of the date and time kept in the timekeeper 14 of the imaging apparatus 1. On the other hand, imaging is often performed continuously a plurality of times with short intervals in between when the imaging is performed. Therefore, even if the latest imaged date/time Ts is not obtained directly, if the modification of the date and time kept by the timekeeper 14 is possible only during the period from when the imaging apparatus 1 is turned on (operation is started) to the first imaging, that is, by prohibiting the modification of the date and time during the period from when the first imaging operation is performed to when the operation stops, it is possible to prevent the order of the imaged date/time attached to the imaged image data reversing from the actual imaged order.

FIG. 6A and FIG. 6B are flowcharts showing a third example and a fourth example of the control procedure performed by the CPU 11 in the date/time modification control process performed in the imaging apparatus 1.

The third example of the date/time modification control process shown in FIG. 6A combines the process in step S101 to step S104 in the first example and the determining process (step S111) in the second example.

After the process in step S101, in the process of step S111, if the imaging operation is already performed after starting the imaging apparatus 1 and branches to "YES", the process of the CPU 11 proceeds to the process in step S102. That is, in the imaging apparatus 1, the CPU 11 first determines only whether the imaging operation is performed, and if it is determined that the imaging operation is performed, the latest imaged date/time Ts is obtained and it is accurately determined whether the imaged date/time attached to the imaged image data may be reversed from the imaged order (the combination (logical conjunction) of step S111 "YES" and step S103 "NO" is the fourth condition).

The fourth example of the date/time modification control process shown in FIG. 6B is a process in which the process in step S112 and step S113 is added to the second example of the date/time modification control process. The same reference numerals are applied to the same processing contents as the first example and the second example of the date/time modification control process and the detailed description is omitted.

In the determining process of step S111, if the imaging operation is already performed after starting the imaging apparatus 1 and branches to "YES", the CPU 11 obtains kept time Tp kept by the timekeeper 14 (step S112). The CPU 11 determines whether the kept time Tp is smaller than (falls behind, may be "equal to or smaller than" instead of "smaller than") the modified date/time Tc (second condition is not satisfied) (step S113).

If it is determined that the kept date/time Tp is smaller than (falls behind, follows) the modified date/time Tc ("YES" in step S113), the process by the CPU 11 proceeds to step S104, and the kept date/time Tp is modified. If it is determined that the kept date/time Tp is not smaller than (ahead of time) the modified date/time Tc ("NO" in step S113), the CPU 11 ends the date/time modification control process.

After the imaging operation is performed, if the modification is to advance the date/time, the imaged date/time attached to the imaged image data does not become an order different from the imaged order. According to the fourth example of the date/time modification control process, by allowing the modification only when the date/time is advanced, the opportunities for modification are increased. According to the process in the fourth example, similar to the second example, the latest imaged date/time Ts is not obtained and there is no need to save the information of the imaged date/time Ts.

Figure 7:
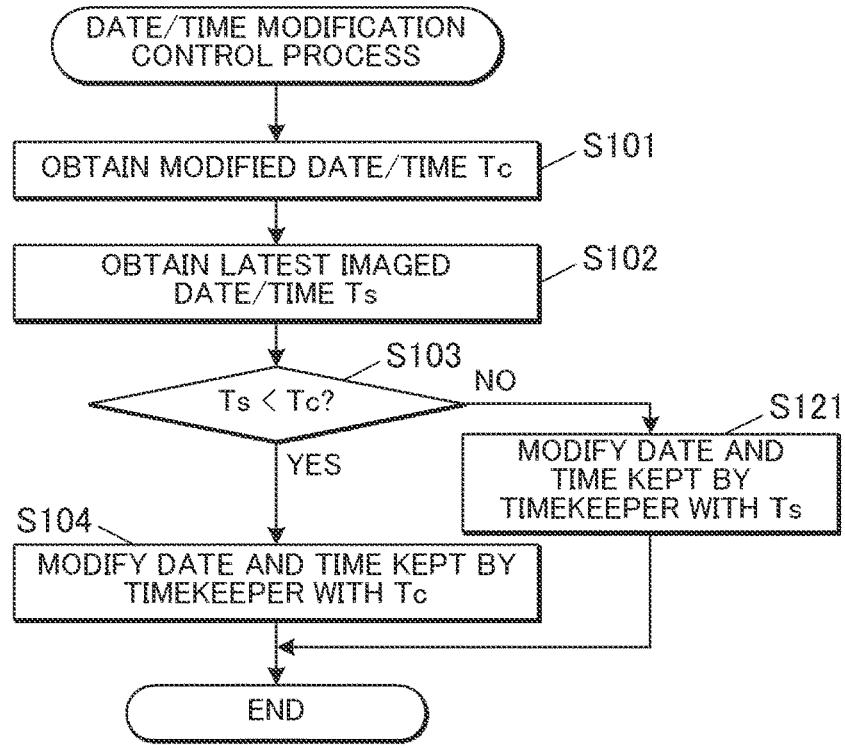
FIG. 7 is a flowchart showing a fifth example of a control procedure of the date/time modification control process.

FIG. 7 is a flowchart showing a fifth example of the control procedure performed by the CPU 11 in the date/time modification control process performed in the imaging apparatus 1. The fifth example of the date/time modification control process is a process in which the process in step S121 is added to the first example of the date/time modification control process. The same reference numerals are applied to the same processing contents as the first example of the date/time correction control process and the detailed description is omitted.

In the determining process in step S103, if it is determined that the latest imaged date/time Ts is not smaller than the modified date/time Tc (the modified date/time Tc is equal to or before the latest imaged date/time Ts) ("NO" in step S103), the CPU 11 modifies the kept date/time kept by the timekeeper 14 to the latest imaged date/time Ts (step S121). Then, the CPU 11 ends the date/time modification control process.

As described above, as long as the order of the imaged date/time attached to the imaged image data is not reversed from the actual imaged order, there is no problem. Even if the kept date/time Tp kept by the timekeeper 14 is modified to be earlier up to the latest imaged date/time Ts, the order is not reversed. By making the kept time Tp closer to the accurate date/time at an early stage, the amount of modification of the date/time can be made smaller at the next occasion of modification. Therefore, it is possible to reduce the possibility that the modified date/time Tc becomes before the latest imaged date/time Ts in the next occasion.

Here, on the premise that the timing that the date/time is modified does not become the same as the next occasion of the imaging operation, the kept date/time Tp is modified to the imaged date/time Ts. Alternatively, considering that the modification timing may be the same as the imaging operation, the CPU 11 may modify the kept date/time Tp to be the date/time after adding a certain amount of time (for example, 1 second) to the imaged date/time Ts (date/time after the imaged date/time Ts).

Figure 8:
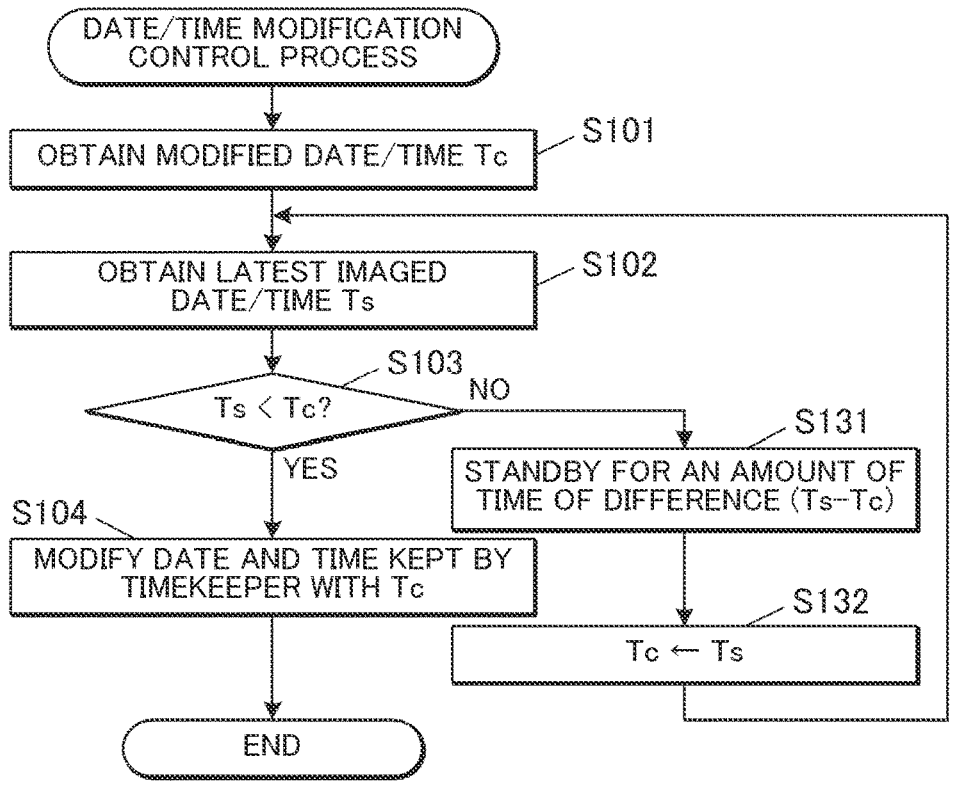
FIG. 8 is a flowchart showing a sixth example of a control procedure of the date/time modification control process.

FIG. 8 is a flowchart showing a sixth example of the control procedure performed by the CPU 11 in the date/time modification control process performed in the imaging apparatus 1. The sixth example of the date/time modification control process is a process in which the process in step S131 and step S132 is added to the first example of the date/time modification control process. The same reference numerals are applied to the same processing contents as the first example of the date/time correction control process and the detailed description is omitted.

In the determining process in step S103, if the process branches to "NO", the CPU 11 stands by for an amount of time of the difference (Ts−Tc) (step S131). The CPU 11 changes the modified time Tc to the latest recorded time Ts obtained in step S102 (step S132). Then, the process by the CPU 11 returns to step S102.

That is, if the modified date/time Tc is before the latest imaged date/time Ts, after the amount of time of the difference elapses from the timing that the modified date/time Tc is obtained, the modified date/time, that is, the accurate date and time kept outside elapses a same amount of time and becomes the same as the imaged date/time Ts. Therefore, by modifying the kept time Tp at this timing (or after this timing), the modified date/time does not become smaller than the latest imaged date/time Ts. However, if a new imaging operation is performed during the amount of time that the CPU 11 stands by, and the latest imaged date/time Ts changes (later), the relation of Ts>Tc is maintained, and the CPU 11 needs to repeat the similar process of standby. If the state of branching to "NO" continues in the determining process in step S103 and the action of turning off the operation is received on the action receiver 16 without modifying the kept date/time Tp (includes a state in which there is no input action continues for a certain amount of time and the CPU 11 proceeds to a standby state (the operation of the CPU 11 is paused)), the date/time modification control process may end without modifying the date/time.

Contrary to the above examples, the kept date/time Tp kept by the timekeeper 14 may always be modified in the date/time modification control process. In this case, if the imaged date/time Ts is associated to the imaged image data in the imaging control process, the correction according to the determination result in the date/time modification control process is performed on the obtained kept date/time Tp and the result is to be the imaged date/time Ts. For example, even if the determination result of the date/time modification control process is that the date/time modification is not performed, the date/time modification is performed and at this time, the difference between the imaged date/time Ts and the modified date/time Tc at this point is calculated. This difference is stored in the storage 13 as the correction value.

If it is the determination result to perform the date/time modification, "0" is set as the correction value. Then, instead of associating the kept date/time Tp to the imaged image data, the corrected date/time in which the obtained correction value is added to the kept date/time Tp is associated to the imaged image data. Such correction value is saved even if the operation is turned off until the next date/time modification control process is performed.

In the imaging apparatus 1 performing such process, if the date/time is used for purposes other than associating with the imaged image data such as displaying the present date/time on the display 17, the modified accurate kept date/time Tp may be used.

FIG. 9 is a flowchart showing a control procedure by the CPU 41 in a date/time information transmitting process performed in the processing apparatus 4. This date/time information transmitting process is included in the program 431. This process is called and performed in a situation that the connection for communication is established between the processing apparatus 4 and the imaging apparatus 1 while the program 431 is running.

The CPU 41 transmits a command regarding ICMP_ECHO such as ping to the imaging apparatus 1 connected for communication (step S401). Such transmission is not limited to one time and may be performed a plurality of times. The CPU 41 obtains communication delay time (amount of time required for communication) according to a response to a command regarding ICMP_ECHO (step S402). When the command is transmitted a plurality of times, the communication delay time can be determined by an average value.

The CPU 41 obtains the present date/time from the timekeeper 44 (step S403). The CPU 41 corrects the present date/time with the communication delay time (step S404). That is, the CPU 41 advances present date/time in an amount of about the communication delay time (sets to a later time). The CPU 41 transmits the date/time that is corrected to the imaging apparatus 1 (step S405). Then, the CPU 41 ends the date/time information transmitting process.

The correction in the amount of the communication delay time can also be performed in the imaging apparatus 1.

FIG. 10 is a flowchart showing a seventh example of the control procedure performed by the CPU 11 in the date/time modification control process performed in the imaging apparatus 1. According to this date/time modification control process, steps S141 to S143 are added to the first example of the date/time modification control process and steps S103 and S104 are changed to steps S103a and S104a respectively. The same reference numerals are applied to the same processing contents and the detailed description is omitted.

After the process in step S102, the CPU 11 transmits the ping to the processing apparatus 4 (step S141). The CPU 11 obtains the communication delay time based on the response time (step S142). The CPU 11 delays the modified date/time Tc for an amount of time obtained by the communication delay time, and modifies the modified date/time Tcm (step S143).

The CPU 11 determines whether the modified date/time Tcm is larger than (ahead of) the latest date/time Ts (step S103a). If it is determined that the modified date/time Tcm is larger than the latest imaged date/time Ts ("YES" in step S103a), the CPU 11 modifies the date/time kept by the timekeeper 14 to the modified date/time Tcm (step S104a). Then, the CPU 11 ends the date/time modification control process. If it is determined that the modified date/time Tcm is not larger than (follows) the imaged date/time Ts ("NO" in step S103a), the CPU 11 ends the date/time modification control process.

As described above, if the kept date/time Tp that is progressing is rewound when the modification of the kept date/time Tp is made based on the modified date/time Tc, the date/time Tp is partially overlapped in the imaging apparatus 1. If the imaging is performed in the overlapping second or later term, the new imaged date/time Ts determined by the kept date/time Tp seemingly becomes earlier than the previous imaged date/time Ts, and the imaged order and the order of the imaged date/time Ts are reversed. In order to prevent such reversal, as a condition to determine a situation to limit or prohibit date/time modification, a condition (predetermined condition) is set to determine whether there is a possibility that the modified date/time Tc becomes earlier than the latest imaged date/time Ts. According to the above determination, the imaging apparatus 1 (program 131) determines whether to perform date/time modification, and at the end, whether to reflect the modification of the date/time to the imaged date/time Ts associated to the imaged image data thereafter. All of the first to fourth conditions provided as examples of the conditions for determination do not have to be used, and any one may be used or a combination of 2 or more conditions which are not mutually exclusive may be used. The predetermined condition may be set so that the user can change the predetermined condition by selection action on the imaging apparatus 1, or the predetermined condition may be fixed from the beginning to a certain condition in advance in the program 131.

As described above, the imaging apparatus 1 according to the present embodiment includes the timekeeper 14 that keeps the time, an imager 18 that generates and records imaged image data, and a CPU 11 that associates as the imaged date/time Ts the date and time at a timing that the imaged image data is recorded by the imager 18 with imaged image data based on the kept date/time Tp kept by the timekeeper 14. If the CPU 11 obtains the modified date/time Tc regarding the modification of the kept date/time Tp, and the CPU 11 determines that the predetermined condition to determine whether the modified date/time Tc may be before the imaged date/time Ts associated with the latest imaged image data is satisfied, the date/time in which the kept time Tp is not modified based on the modified date/time Tc is associated as the imaged date/time Ts to the imaged image data recorded thereafter.

As described above, even when the modified date/time Tc is obtained, the modified date/time Tc is not always reflected on the associated imaged date/time Ts. Therefore, it is possible to avoid situations such as the order of the associated imaged date/time being reversed from the actual imaged order of the imaged image data. Consequently, it is possible to suppress problems that occur regarding modification of the date/time such as problems with integrating with other information.

The predetermined conditions include the first condition which is the modified date/time Tc is before the imaged date/time Ts associated with the latest imaged image data.

As described above, by an easy process which is to simply not perform modification in a situation that the order of the imaged date/time may be reversed, it is possible to avoid date/time modification at an inappropriate timing.

Alternatively, the predetermined condition may include the second condition which is the modified date/time Tc is before the counted date/time Tp. According to such condition, there is no situation that the order of the imaged date/time Ts becomes different from the imaged order due to the date/time modification. Therefore, it is possible to easily prevent the problems caused by date/time modification.

The imaging apparatus 1 includes an action receiver 16 that receives action regarding switching of on and off of the operation of the imaging apparatus 1. The predetermined condition may include the third condition showing the point of determination is from when the first imaged image data is obtained after the operation starts in response to the action received on the action receiver 16 to when the operation stops.

As described above, by limiting the term that the date/time can be modified to a term from when the imaging apparatus 1 is started to the first imaging, it is possible to suppress problems such as the order of the seeming imaged date/time reversing and the imaging interval becoming unnaturally large by the modification of the date/time between successive occasions of imaging.

Alternatively, the predetermined condition may include the fourth condition in which the modified date/time Tc is before the kept date/time Tp and the point that the determination is performed is from when the first imaged image data is obtained after the operation starts in response to the action received on the action receiver 16 to when the operation stops.

As described above, there is no need to prohibit the date/time modification uniformly after the imaging operation is performed, because the seeming imaged order is not reversed if the modification is to advance the date/time. Therefore, by allowing such modification, it is possible to make the date and time closer to the accurate date and time.

The imaging apparatus 1 includes a communicator 15. The CPU 11 obtains the modified date/time from outside through the communicator 15. With this, the input action to modify the date/time does not need to be performed on the imaging apparatus 1 and there is no need for the imaging apparatus 1 to obtain the modified date/time on its own (for example, by receiving radio waves from a positioning satellite). Therefore, the date/time modification can be easily performed. Consequently, the imaging apparatus 1 is able to suppress the possibility that the difference of the date/time increasing by not performing the date/time modification.

In a situation that the modified date/time Tc is received from the external processing apparatus 4, the CPU 11 obtains the amount of time required for communication with the source that transmits (processing apparatus 4) the modified date/time Tc and the modified date/time Tcm correcting the modified date/time Tc with the required amount of time may be obtained.

As described above, by controlling the setting of the recorded date/time to the imaged image data in the imaging apparatus 1 that records the imaged image data, it is possible to prevent the imaged date/time being attached in an odd order to the imaged image data in which the order of the imaging may be important information. Therefore, the handling of the imaged image data and the integration with other data becomes easy.

According to the present embodiment, the time setting control method includes generating imaged image data, associating the time (date/time) which is the timing that the imager 18 performing the recording records the data as the imaged date/time Ts to the imaged image data based on the kept date/time Tp kept by the timekeeper 14, and obtaining the modified date/time Tc regarding the modification of the kept date/time Tp. In the time setting, in a situation that the modified date/time Tc is obtained, and it is determined that the predetermined condition to determine whether the modified date/time Tc may be before the imaged date/time Ts associated with the latest imaged image data is satisfied, the date/time in which the kept time Tp is not modified based on the modified date/time Tc is associated as the imaged date/time Ts to the imaged image data recorded thereafter. This includes the situation in which the imaged date/time Ts is used as is without modifying the kept date/time Tp using the modified date/time Tc as described in the above embodiment. That is, the determination regarding the predetermined condition does not have to be performed at the timing that the imaged date/time Ts is associated but can be performed in advance (when the modified information is obtained), and simply the modified or not modified kept date/time Tp may be used when associating the imaged date/time Ts.

According to such time setting control method, it is possible to suppress the imaged date/time Ts attached to the imaged image data from being reversed from the order different from the imaged order. Therefore, it is possible to suppress problems from occurring in the process and use of the imaged image data due to the difference between the actual imaged order and the order of the imaged date/time.

According to the program 131 of the present embodiment, the program 131 controls the computer (including at least the CPU 11, the RAM 12, and the communicator 15) to perform, generating imaged image data, associating the date and time which is the timing that the imager 18 performing the recording records the imaged image data as the imaged date/time Ts to the imaged image data based on the kept date/time Tp kept by the timekeeper 14, and obtaining the modified date/time Tc regarding the modification of the kept date/time Tp. In the time setting, in a situation that it is determined that the predetermined condition to determine whether the modified date/time Tc may be before the imaged date/time Ts associated with the latest imaged image data, the date and time in which the kept date/time Tp is not modified based on the modified date/time Tc is associated as the imaged date/time Ts to the imaged image data recorded thereafter. Similar to the time setting control method, the determination of the predetermined condition does not have to be performed at the timing that the imaged date/time Ts is associated and may be performed in advance.

By installing such program 131 in the computer, it is possible to easily control the date/time modification by software control. Therefore, the imaged date/time of the imaged image data can be suitably managed easily, and the problems regarding the imaged order can be suppressed.

The present disclosure is not limited to the above embodiments and various changes are possible.

For example, according to the above embodiment, the date/time information is transmitted to the imaging apparatus 1 automatically or in response to input action on the processing apparatus 4 but the embodiments are not limited to the above. In response to input action on the imaging apparatus 1, the contents of communication requesting to the processing apparatus 4 to transmit the date/time information may be transmitted to the processing apparatus 4, and the processing apparatus 4 may transmit the date/time information in response to such request.

According to the above-described embodiment, each time the operation of the imaging apparatus 1 is performed, the date/time information is transmitted from the processing apparatus 4 to the imaging apparatus 1 only once at a timing that the connection for communication is established between the processing apparatus 4 and the imaging apparatus 1, however the embodiments are not limited to the above. In a situation that the connection for communication is continuously established, the processing apparatus 4 may transmit the date/time information a plurality of times to the imaging apparatus 1 at a suitable interval of time.

According to the above embodiment, the communication delay time is considered, but the communication delay time does not always have to be considered. For example, in a situation that it is clear that the communication delay time is small and stable without measuring the communication delay time as in a small network, the processing apparatus 4 does not reflect the communication delay time and simply transmits the date and time kept by the timekeeper 14.

The processing apparatus 4 may check the history of connection with the NTP server when the program 431 is started and if a difference is expected to be seen in the date and time kept by the timekeeper 44 (for example, 1 second or more), the date and time kept by the timekeeper 44 may be modified before transmitting the date/time information to the imaging apparatus 1.

The program 431 is started by user action but the program 431 may be set so that the program 431 is automatically started and stays resident when the processing apparatus 4 is started.

The modified date/time Ts transmitted from the processing apparatus 4 does not have to be the date and time kept by the timekeeper 44 of the processing apparatus 4. The date and time that the processing apparatus 4 obtains from outside may be transferred as is to the imaging apparatus 1.

The imaging apparatus 1 is not limited to an apparatus in which the switching action of the on and off of the operation is performed by a dedicated switch. For example, the operation imaging apparatus 1 may turn on when the shutter button is half pressed. Moreover, when the input action is not performed for a specified amount of time (for example, 1 to 2 minutes) or more, the operation may be automatically stopped. A situation of stopping the operation due to no input action for the specified amount of time (proceeding to a stand-by state) may be a pause of an operation different from the stop of the operation by the switching switch, for example, the operation by the CPU 11 may stop but the refreshing operation by the RAM 12 may continue. The recovery of the operation from such pause of operation may not apply to the "start" as described in the second example to the seventh example.

The recording operation (imaging operation) is not limited to operations performed by action by the user. As described above, a measured value in a physical sensor may trigger the start of recording in a monitoring apparatus. Alternatively, the measured value of the physical sensor may be recorded periodically for a term determined in advance and/or at an interval determined in advance.

The connection to perform communication between the imaging apparatus 1 and the processing apparatus 4 is not limited to Wi-Fi (wireless LAN) as long as the transmitting and receiving of the recorded data are possible. The above-described Bluetooth or USB may be used, and connection may be established by wired LAN. Alternatively, communication by other communication standards such as infrared communication and optical communication can be performed.

According to the present embodiment, the controller (processor) of the imaging apparatus 1 is to be the CPU 11 but the embodiment is not limited to the above. The controller may be a dedicated microcomputer, or may include a control chip including a logic circuit for performing specific processes or an arithmetic processing circuit.

According to the present embodiment, the system to manage the medical data is described as the recording system 100, but the embodiment is not limited to the above.

For example, the recorded data may be data for business use or administrative purposes or the recorded data may be non-profit (including hobby activities) recorded by individuals.

The specific method to associate the imaged date/time is not limited. For example, the data may be attached to the imaged image data as header data, or an image may be inserted in the imaged image to display the date/time in a specific position.

In the imaging apparatus 1 according to the present embodiment, if the product is for commercial use and the kept date/time is not modified for long periods of time and it is not assumed to keep and not transmit the imaged image data to external devices, that is, if the shift in the kept date/time does not become that large in the product (for example, 10 minutes or 1 hour or more), the timekeeper 14 may only keep the time and not the date, and the kept time may be obtained.

The time setting control method according to the present embodiment is not limited to the setting control in the imaging apparatus 1. The method can be applied to control operation in a control apparatus or an external device in a situation that the imaged image data is obtained by an external control apparatus or external device connected to the imaging apparatus 1 and the imaged date/time is associated to imaged image data based on the date and time kept by the imaging apparatus 1.

According to the above description, the storage 13 is provided as an example of a nonvolatile memory such as an HDD, a flash memory or the like which is a computer-readable storage medium that stores the program 131 related to the control of the time setting according to the present disclosure. However, the storage is not limited to the above. As the computer-readable storage medium, a nonvolatile memory such as a MRAM, etc., an HDD, and a portable storage medium, such as a CD-ROM, a DVD disk, etc. may also be used. A carrier wave is also applied as the medium to provide data of the program according to the present disclosure through the communication lines.

Other specific configurations, contents and procedures of the processing apparatus, and the like as described in the above embodiments may be suitably changed without leaving the scope of the present disclosure.

Although some embodiments of the present disclosure have been described above, the scope of the present disclosure is not limited to the embodiments described above, but includes the scope of the disclosure described in the claims and their equivalents.

The invention claimed is:

1. A recording apparatus comprising:
a timekeeper;
a recorder; and
at least one processor configured to perform processes comprising:
associating a time at a timing that data is recorded in the recorder with the data as a recorded time, the time being based on a kept time kept by the timekeeper;
obtaining a modified time including a modification of the kept time; and
in a situation that it is determined that a predetermined condition is satisfied, the predetermined condition being a condition for determining whether there is a possibility that the modified time is before the recorded time associated with latest data recorded in the recorder, associating the time in which the kept time is not modified based on the modified time with data recorded after the latest data as the recorded time.

2. The recording apparatus according to claim 1, wherein the predetermined condition includes a condition that the modified time is before the recorded time associated with the latest data.

3. The recording apparatus according to claim 1, wherein the predetermined condition includes a condition that the modified time is before the kept time.

4. The recording apparatus according to claim 1, further comprising a switch that receives an action regarding switching of on and off of operation of the recording apparatus,
wherein the predetermined condition includes a condition that a point at which it is determined whether the predetermined condition is satisfied is from when first data is obtained after the operation starts in response to the action received by the switch to when the operation stops.

5. The recording apparatus according to claim 1, further comprising a switch that receives an action regarding switching of on and off of operation of the recording apparatus,
wherein the predetermined condition includes a condition that (i) the modified time is before the kept time and (ii) a point at which it is determined whether the predetermined condition is satisfied is from when first data is obtained after the operation starts in response to the action received by the switch to when the operation stops.

6. The recording apparatus according to claim 1, further comprising a communicator,
wherein the processor obtains the modified time from outside via the communicator.

7. The recording apparatus according to claim 6, wherein in a situation that the modified time is received from the outside, the processor obtains an amount of time required for communication with a source of transmission of the modified time and corrects the modified time with the amount of time required for the communication.

8. The recording apparatus according to claim 1, further comprising a camera that includes an optical system and a detector that detects light incident through the optical system, the camera generating and recording imaged image data based on the light detected by the detector,
wherein the data comprises the imaged image data recorded by the camera.

9. A time setting control method comprising:
associating a time at a timing that data is recorded in a recorder that records the data with the data as a recorded time, the time being based on a kept time kept by a timekeeper;
obtaining a modified time regarding a modification of the kept time;
determining whether a predetermined condition is satisfied, the predetermined condition being a condition for determining whether there is a possibility that the modified time is before the recorded time associated with latest data recorded in the recorder; and
in response to determining that the predetermined condition is satisfied, associating the time in which the kept time is not modified based on the modified time with data recorded after the latest data as the recorded time.

10. The time setting control method according to claim 9, wherein the predetermined condition includes a condition that the modified time is before the recorded time associated with the latest data.

11. The time setting control method according to claim 9, wherein the predetermined condition includes a condition that the modified time is before the kept time.

12. The time setting control method according to claim 9, wherein the predetermined condition includes a condition that a point at which the determining is performed is from when first data is obtained after operation of a recording apparatus starts in response to an action received by a switch to when the operation stops, the switch being a switch that receives the action regarding switching of on and off of the operation of the recording apparatus, and the recording apparatus including the recorder.

13. The time setting control method according to claim 9, wherein the predetermined condition includes a condition that (i) the modified time is before the kept time and (ii) a point at which the determining is performed is from when first data is obtained after operation of a recording apparatus starts in response to an action received by a switch to when the operation stops, the switch being a switch that receives the action regarding switching of on and off of the operation of the recording apparatus, and the recording apparatus including the recorder.

14. The time setting control method according to claim 9, wherein the modified time is obtained from outside via a communicator, and the method further comprises obtaining an amount of time required for communication with a source of transmission of the modified time, and correcting the modified time with the amount of time required for the communication.

15. A non-transitory computer-readable storage medium storing a program executable by a computer to control the computer to perform processes comprising:
associating a time at a timing that data is recorded in a recorder that records the data with the data as a recorded time, the time being based on a kept time kept by a timekeeper;
obtaining a modified time including a modification of the kept time; and
in a situation that it is determined that a predetermined condition is satisfied, the predetermined condition being a condition for determining whether there is a possibility that the modified time is before the recorded time associated with latest data recorded in the recorder, associating the time in which the kept time is not modified based on the modified time with data recorded thereafter after the latest data as the recorded time.

16. The storage medium according to claim 15, wherein the predetermined condition includes a condition that the modified time is before the recorded time associated with the latest data.

17. The storage medium according to claim 15, wherein the predetermined condition includes a condition that the modified time is before the kept time.

18. The storage medium according to claim 15, wherein the predetermined condition includes a condition that a point at which it is determined whether the predetermined condition is satisfied is from when first data is obtained after operation of a recording apparatus starts in response to an action received by a switch to when the operation stops, the switch being a switch that receives the action regarding switching of on and off of the operation of the recording apparatus, and the recording apparatus including the recorder and the computer.

19. The storage medium according to claim 15, wherein the predetermined condition includes a condition that (i) the modified time is before the kept time and (ii) a point at which it is determined whether the predetermined condition is satisfied is from when first data is obtained after operation of a recording apparatus starts in response to an action received by a switch to when the operation stops, the switch being a switch that receives the action regarding switching of on and off of the operation of the recording apparatus, and the recording apparatus including the recorder and the computer.

20. The storage medium according to claim 15, wherein the modified time is obtained from outside via a communicator, and the processes further comprise obtaining an amount of time required for communication with a source of transmission of the modified time, and correcting the modified time with the amount of time required for the communication.

* * * * *

UNITED STATES PATENT AND TRADEMARK OFFICE
CERTIFICATE OF CORRECTION

| | |
|---|---|
| PATENT NO. | : 12,225,322 B2 |
| APPLICATION NO. | : 18/119367 |
| DATED | : February 11, 2025 |
| INVENTOR(S) | : Muneyuki Ishihara and Yuya Hayashi |

It is certified that error appears in the above-identified patent and that said Letters Patent is hereby corrected as shown below:

In the Claims

Column 18, Line 52, after "recorded" delete "thereafter".

Signed and Sealed this
Twenty-sixth Day of August, 2025

Coke Morgan Stewart
*Acting Director of the United States Patent and Trademark Office*